United States Patent Office 3,160,544
Patented Dec. 8, 1964

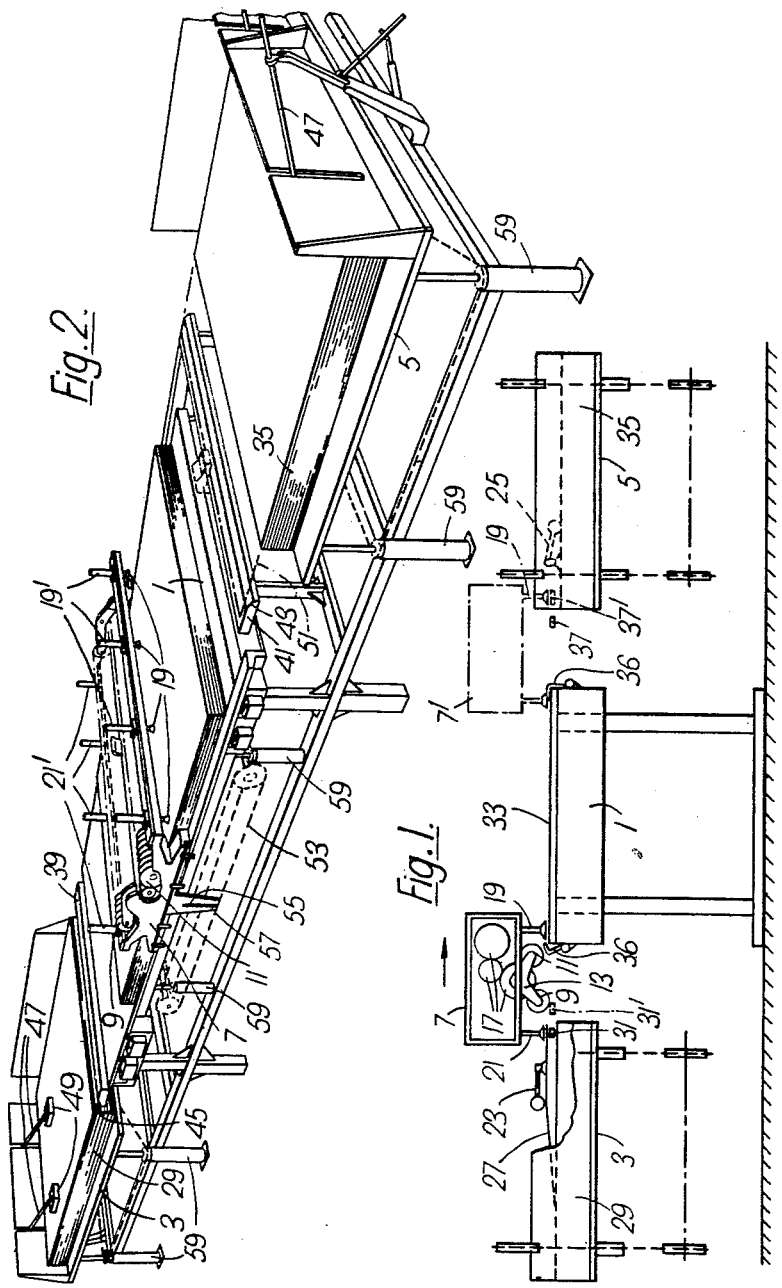

3,160,544
APPARATUS FOR PRODUCING A STACK OF
UNEXPANDED HONEYCOMB MATERIAL
George May, 56 Bridgewater Road, Wembley, England,
and Desmond Deverell White, 29 Goodyears Ave.,
Radlett, England
Filed Sept. 15, 1960, Ser. No. 157,287
9 Claims. (Cl. 156—387)

The present invention relates to structural honeycomb materials formed from sheet material and has as an object the provision of an improved method of, and apparatus for, the manufacture thereof.

In the production of structural honeycomb materials, which are described in Patents Nos. 2,428,979 and 2,527,752 of George May, layers of the sheet material are secured together in the form of a stack by parallel bands of adhesive which are so spaced and arranged that the bands at one face of any intermediate layer are staggered so as to lie between the bands at the other face of said layer. This arrangement of the bands of adhesive allows the stack to be expanded to the cellular state. Normally the expanded material is required in the form of slices in which axes of the cells, which are normally hexagonal, run in the direction of the thickness. These slices may be formed by slicing the stack after expansion thereof, using for example a band saw, but it is usually more convenient to slice the stack in the unexpanded form by means of a guillotine and to expand the resulting slices thereafter. Besides being especially convenient, this procedure is conducive to a high degree of dimensional accuracy in the thickness of the expanded slices.

In a preferred manufacturing procedure, the adhesive is applied by printing it on to the top of the stack after each layer has been placed in position thereon. This procedure is conducive to accurate registration of the bands of adhesive relative to one another and is for this reason to be preferred to procedures where the adhesive is applied to the layers before they are brought into position and in which the accuracy of registration depends upon the accuracy with which the layer can be so brought.

In addition the technique of printing on the stack tends to be the most practicable method when using an adhesive of the type which must be in the wet condition when the layers are superposed. An adhesive of this type is normally preferred when the sheet material is an absorbent material, for example paper or the thin cardboard like material known to the trade as chipboard. These materials are poor conductors of heat and the curing of a heat curable adhesive which is in the dry but still heat curable state when the layers are superposed is achieved only slowly or by the use of expensive apparatus such as a press provided with a radio frequency heater.

Various difficulties have been encountered in mechanising production by the preferred procedure in which printing is effected on the stack, especially where a high rate of production is required without undue mechanical complexity and it is an object of the present invention to produce a method and apparatus wherein these difficulties are avoided.

In accordance with the present invention there is provided apparatus for the production of a stack of unexpanded honeycomb material from sheet material which comprises a support for the stack to be formed, a printing head mounted for repeated forward and return motion over the support, a printing device on the printing head constructed and arranged to print a set of parallel bands of adhesive on the stack during the forward motion of the head and, during the return motion of the head, a set of parallel bands of adhesive which are staggered relative to the bands printed during the forward motion, and conveyor means mounted for reciprocation over the support in synchronism with the motion of the printing device for engaging sheet material, carrying it over each set of printed bands and releasing it thereonto for printing in its turn. Conveniently, the printing device comprises a pair of printing rollers one for each of said set of bands; for example the rollers may be mounted upon a carrier which is pivotally mounted on the printing head in such a manner that the rollers are brought into their operative positions in turn.

In a preferred form of the apparatus the conveyor means is mounted upon the printing head for reciprocation thereby; it may for example comprise two sets of pneumatic suckers positioned one on the forward side, and one on the rearward side of the printing device and provided with means by which each set may be actuated to engage the sheet material, draw it over the support as the head moves in one direction, and release it to be printed on its upper surface as the head moves in the opposite direction.

Various arrangements for supplying the sheet material to the conveyor means may be adopted within the scope of the invention. In one preferred arrangement the support has a pair of stillages positioned to hold a pair of piles of precut sheets of the sheet material, one at each end of the support, in positions such that the sheets may be engaged in turn by the conveyor means.

In another arrangement which can be adopted where the sheet material is supplied in the form of rolls the support is provided at each end thereof with a cutting device synchronised with the printing head, and operable to cut, into sheets, sheet material drawn from rolls by the conveyor means.

In yet another arrangement the conveyor means is mounted for reciprocation perpendicular to the direction of motion of the printing head and is operable to position a plurality of sheets of the sheet material along the path of the printing head for printing one after the other during the forward motion and during the return motion of the head. With this arrangement a series of stacks is produced simultaneously.

The following description of preferred embodiments of the invention is given by way of illustration. In said description reference is made to the accompanying diagrammatic drawings in which:

FIGURE 1 shows one preferred form of the apparatus in side elevation, and

FIGURE 2 shows another preferred form of the apparatus in perspective.

In the apparatus shown in FIGURE 1 a vertically movable support 1 has a pair of vertical movable stillages 3 and 5 positioned one at each end thereof. Reciprocably mounted over the support 1 is a printing head 7. In FIGURE 1, the head 7 is shown in its extreme left-hand position and is about to move in the direction of the arrow. The direction of the arrow will hereinafter be termed the forward direction and the opposite direction will be termed the reverse direction. The left- and right-hand ends of the head as seen in FIGURE 1 will consequently be regarded as the leading and trailing ends. The extreme right-hand position of the head is shown in broken lines at 7'.

Mounted on the underside of the head 7 is a pair of printing rollers 9 and 11 carried by a pivotally mounted carrier 13. Within the head are provided adhesive transfer rollers 17 for the transfer of adhesive from a reservoir to the printing rollers 9 and 11.

Underneath the head are mounted suckers arranged in two rows 19 and 21 which extend across the direction of motion and are positioned near the leading and trailing ends of the head respectively. Only the end suckers of the rows are seen in FIGURE 1. Further rows of suckers are mounted on pivoted arms above the supports 3 and 5, the end suckers of said rows being seen at 23 and 25.

In the position in which the parts of the machine are shown in FIGURE 1 the suckers 23 have engaged and raised the end of the top sheet 27 of a pile of pre-cut sheets 29 of sheet material carried by the stillage 3. A pivotally mounted bar 31 has swung from position 31' (in which it has enabled the end of the sheet 27 to be raised) and is now positioned under the raised end of said sheet. The upper surface of the sheet has been engaged by the suckers 21.

During previous cycles of reciprocation of the head, a number of sheets 33 have been secured together upon the support 1.

The vacuum supply from sucker 23 is cut off and the head 7 moves in its forward direction conveying the sheet 27 over the sheets 33. Whilst being conveyed it is held clear of the sheets 33 by the suckers 21 and the bar 31. As the head moves over the stack, a set of parallel bands of adhesive is printed upon the uppermost of the sheets 33 by the roller 9.

When the head reaches the position 7' the vacuum supply to the cups 21 is cut off allowing the sheet 27 to fall into position over the bands of adhesive which have just been applied by the roller 9. The uppermost sheet of a second pile of sheet material 35 carried by the stillage 5, has been lifted by the sucker 25 and a bar 37 similar to the bar 31 has swung into position 37' under the left-hand end of said sheet. As the head moves to the left in its return motion, the carrier 17 is pivoted to bring the roller 11 into printing engagement with the upper surface of the sheet 27. Bands of adhesive staggered relative to the bands applied by the roller 9 are thus printed on the top of the sheet 27 and simultaneously the sheet taken from the pile 35 is carried over the sheet 27 and eventually dropped into position for printing by the roller 9 during the next forward stroke.

Displacement of the sheets of the stack under the action of the printing rollers is prevented by automatically actuated grippers 36 positioned at each end thereof.

As the sheet material is transferred from the stillages 3 and 5 to the support 1, the support 1 is lowered and the stillages 3 and 5 are raised by mechanical gear (not shown) at a rate such that the three sheets which are uppermost at any particular time are all maintained substantially at the required level. As will be understood, staggering of the bands of adhesive is obtained in a very simple manner without side to side movement of the printing rollers or of the stack accumulating upon the support 1. Moreover, as each forward and each return transit of the printing head results in the application of a fresh sheet to the stack and the application of adhesive to the sheet applied immediately before, the piling up of the sheets and the application of the adhesive are both obtained in a substantially continuous manner. A high rate of production is accordingly achieved.

Where desired, piles of two different sheet materials may be placed upon the stillages 3 and 5 respectively so that said sheet materials alternate in the stack produced.

The principal mechanical factor which limits the speed of production is the inertia of the head 7 which must necessarily be overcome in reversing the head at each end of its travel. The rate of output of honeycomb material by the machine is therefore mainly dependent upon the size of the sheet material which it is designed to handle.

In a modification of the machine intended for use where a greatly increased rate of output is required, the stillages 3 and 5 are replaced by a number of stillages arranged along one or both sides of the support 1 (which is suitably lengthened) and conveyor means, mounted for reciprocation across the direction of travel of the printing head is constructed and arranged to convey the top sheets from the stillages simultaneously. The printing head is thus used to print on a series of stacks at each transit.

In a modification of the apparatus as described with reference to FIGURE 1, or modified as just indicated, the stillages for the pre-cut sheets are replaced by means for holding continuous rolls of sheet material, and cutting means are added near the bars 31 and 37 for cutting the sheet material transversely into lengths as the printing head reciprocates.

The apparatus shown in FIGURE 2 is generally similar to that shown in FIGURE 1. Corresponding parts are shown with corresponding reference numerals. The principal difference is in the means for raising the top sheets from the piles and holding them clear of the adhesive whilst being conveyed by the suckers. In this case stationary cross members 39 and 41, positioned between the support 1 and the stillages 3 and 5 are bevelled to provide ramps 43 and 45 which face outwardly. Mounted at the outer ends of the stillages are pneumatically actuated rods 47 provided at their ends with pads 49 which rest upon the two top sheets. Whilst the head is clear of the stillage 5, the pads resting on the uppermost 51 of sheets carried thereon move inwardly. The edge of the said sheet travels up the ramp 43 and comes to rest on top of the bar 41 in the position shown. As the sheet is drawn over the support 1 by the suckers 19, which are reciprocated vertically by pneumatic cylinders 19' to assist their action, it is supported by the top of the bar 41 until head 7 nears the end of its travel.

The reciprocation of the head is produced by an endless chain 53 having a peg 55 which engages a vertical slot 57 in a downwardly projecting plate secured to the head. The vertical adjustment in the position of the stillages 3 and 5 and the support 1 is obtained by chain driven screwjacks 59.

In a modification of the apparatus shown in FIGURE 2, the bevelled cross members 39 and 41 are omitted, and for supporting the end portion of each sheet as it is fed forward a pair of rails running in the direction of motion and level with the top sheets on the stillages is provided at each end of the support 1. The suckers 19 and 21 are mounted upon cross bars arranged at each end of the head, each cross bar being carried at its ends by pneumatic rams arranged to give the bars a vertical motion such that the sheets are clear of the top of the stack whilst being carried thereover and have their ends lowered substantially into contact with the last printed sheet before being released. This lowering prevents the sheets drifting under the action of entrapped air. The two printing rollers are movable independently of one another by further pneumatic rams; they are kept continuously rotating in opposite directions, together with their feed rollers, by an electric motor carried on the head and the adhesive reservoir is maintained filled by a pump feeding adhesive from a tank via flexible tubing. Grippers like the grippers 36 of FIGURE 1, are pneumatically pivoted by the action of further rams. They grip the ends of the stack in turn as the head moves away therefrom and not only prevent disturbance but also assist in supporting the sheets whilst they are being drawn into position. The support 1 and the stillages 3 and 5 are moved vertically by follow-up drives actuated by micro switches and the stillages are provided with transverse rails carrying trolleys adapted to be wheeled into position on the stillages after being loaded with a supply of sheet material (e.g., ½ ton thereof) carried upon a pallet placed thereon by a fork-lift truck or crane.

We claim:

1. Apparatus for the production of a stack of unexpanded honeycomb material from sheet material which comprises a support for the stack to be formed, a printing head mounted for repeated forward and return motion over the support, a printing device on the printing head constructed and arranged to print a set of parallel bands of adhesive on the stack during the forward motion of the head and, during the return motion of the head, a set of parallel bands of adhesive which are staggered relative to the bands printed during the forward motion, and conveyor means mounted for reciprocation over the support in synchronism with the head for engaging sheet material carrying it over each set of printed bands and stacking it thereon for stacking it and printing it in its turn.

2. Apparatus according to claim 1 in which the printing device comprises a pair of printing rollers, one for each of said set of bands.

3. Apparatus according to claim 1 in which the conveyor means is mounted upon the printing head for reciprocation thereby.

4. Apparatus according to claim 3 in which conveyor means comprises pneumatic suckers on the forward and rearward sides of the printing head.

5. Apparatus according to claim 1 in which the support is provided at each end thereof with grippers operable to engage the top of the stack and thereby prevent movement thereof during the application of the adhesive.

6. Apparatus according to claim 1 in which the support has, at each end therof, cutting means synchronised with the printing head and operable to cut into sheets, sheet material drawn from rolls by the conveyor means.

7. Apparatus according to claim 1 in which the conveyor means is mounted for reciprocation perpendicular to the direction of motion of the printing head and is operable to position a plurality of sheets of the sheet material along the path of the printing head for printing one after the other, during the forward motion and the return motion of the head.

8. Apparatus for the production of a stack of unexpanded honeycomb material from sheet material which comprises a support for the stack to be formed, a pair of stillages positioned to hold a pair of piles of pre-cut sheets of the sheet material one at each end of the support, a printing head mounted for repeated forward and return motion over the support, a printing device on the printing head constructed and arranged to print a set of parallel bands of adhesive on the stack during the forward motion of the head and, during the return motion of the head, a set of parallel bands of adhesive which are staggered relative to the bands printed during the forward motion, and conveyor means mounted on the printing head for reciprocation over the support thereby for engaging sheets from the stillages alternately carrying them over the printed bands and stacking them thereon for printing in their turn.

9. Apparatus according to claim 8 in which the stillages are arranged to receive the piles whilst the piles are mounted on pallets suitable for use with a fork lift crane or truck.

References Cited in the file of this patent

UNITED STATES PATENTS

| | | |
|---|---|---|
| 1,972,952 | Radzinsky | Sept. 11, 1934 |
| 2,169,638 | Gilfillan | Aug. 15, 1939 |
| 2,382,929 | Williams | Aug. 14, 1945 |
| 2,600,205 | Carter | June 10, 1952 |
| 2,608,316 | Hall et al. | Aug. 26, 1952 |
| 2,733,683 | Holm | Feb. 7, 1956 |